TIME (DISTANCE)

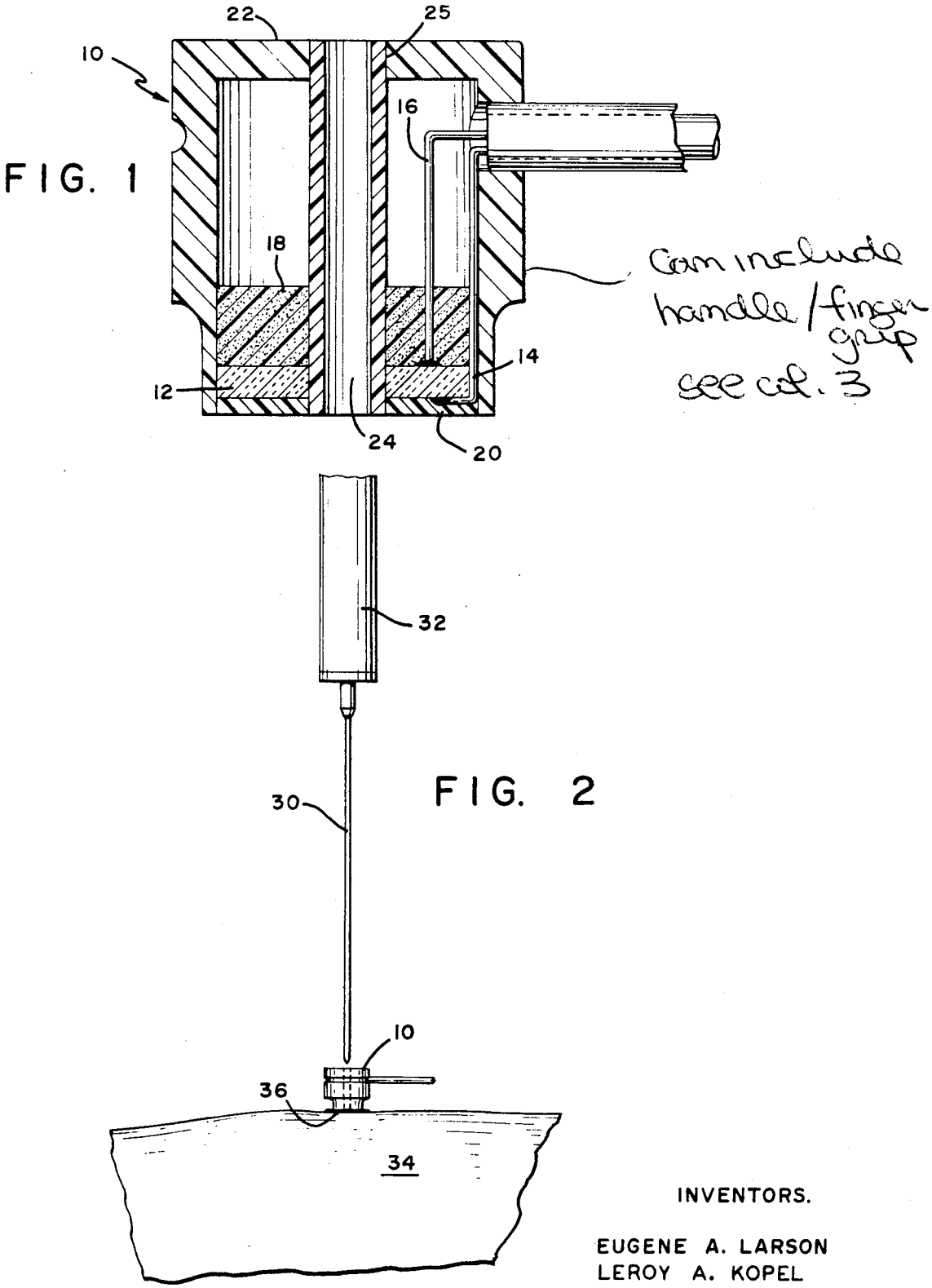

INVENTORS.

EUGENE A. LARSON
LEROY A. KOPEL
DANIEL E. MCNULTY
BY:

3,721,227
TRANSDUCER FOR PULSE-ECHO
ULTRASONIC EXPLORATION
Eugene A. Larson, P.O. Box 552, Lewistown, Pa. 17044;
Le Roy A. Kopel, 20 E. Market St., McVeytown, Pa.
17051; and Daniel E. McNulty, R.D. 4, Box 75B,
Lewistown, Pa. 17044
Filed Aug. 24, 1971, Ser. No. 174,319
Int. Cl. A61b 5/00
U.S. Cl. 128—2 V    9 Claims

ABSTRACT OF THE DISCLOSURE

A transducer for pulse-echo ultrasonic exploration is provided with a substantially centrally disposed aperture through which a surgical instrument is passed. The transducer aids in locating the surgical instrument accurately within an opaque body and monitoring the progress of the particular procedure.

This invention refers to a transducer for pulse-echo ultrasonic exploration and has reference to a transducer for use in medical or surgical procedures. More specifically, the present invention refers to an ultrasonic transducer which is extremely useful when used in conjunction with certain surgical procedures involving the withdrawal of fluid or tissue from within an opaque body whereby the instrument or needle used for such purpose can be located more precisely within the opaque body, and the progress of the surgical procedure can be monitored with a high degree of accuracy and reliability. Quite specifically the transducer disclosed hereafter is designed to fit over surgical instruments, such as biopsy or aspiration needles, in order to aid the placing of the tip of such an instrument within a living body and monitor the progress of the surgical procedure and instrument using standard ultrasonic pulse-echo techniques, the signals displayed being monitored by a physician or technician performing the particular procedure.

Further and other objects and advantages of the present invention will be more clearly apparent by reference to the following description when taken in conjunction with the accompanying drawing, in which:

FIG. 1 is a sectional view of a typical embodiment of the pulse-echo ultrasonic transducer forming the invention;

FIG. 2 is an illustration of the use of the transducer in conjunction with a surgical tool or other medical device;

Figure 3A:
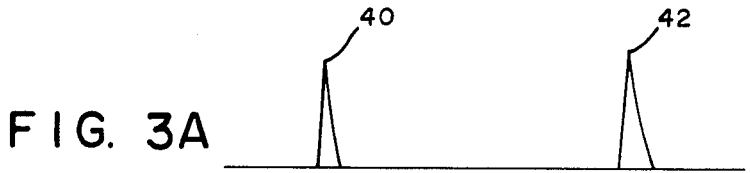
FIGS. 3A, 3B and 3C, are schematic illustrations of the display obtained on a cathode ray tube showing the progress of a surgical procedure involving the draining of a cyst.

Referring now to the figures and FIG. 1 in particular, numeral 10 indicates a pulse-echo ultrasonic transducer which includes a piezoelectric wafer 12, typically made of lead zirconate titanate, whose opposite radial surfaces are connected to a set of electrical conductors 14 and 16, as is well known in the art. The rear surface of the piezoelectric wafer is in contact with a damping material 18, such as tungsten powder filled plastic resin material. The front surface of the piezoelectric material is covered by an acoustic matching and protective plate 20 made, for instance, of epoxy material. The elements described heretofore are enclosed within a housing 22 which completely insulates the encapsulated structure to withstand a direct current breakdown voltage of at least 2,000 volts between any of the surfaces. The housing also is made of material which is suitable to undergo gas sterilization as is necessary for surgical procedures.

A specific feature of the present invention resides in the provision of a substantially centrally located aperture 24 which is lined with a tubing 25 made, typically, of polymeric plastic material and which is bonded in place to the housing and other parts by a thin layer of epoxy resin or similar bonding material. The inside diameter of the tubing 25 is selected so that the transducer slidingly fits over the surgical instrument, such as the needle 30 of an aspiration instrument 32, see FIG. 2. In a typical instance the inside diameter of the tubing 25 has a diameter of approximately 0.104 to 0.106 inch which allows most common aspiration and biopsy needles to be passed through the transducer center and also allows sufficient room for sterile tubing (not shown) to be inserted into the tubing 25 to prevent contamination of the sterile needle 30 when it is passed through.

If the surgical instrument is of rectangular cross section, the tubing 25 will be made to provide a corresponding cross section at its inside. Alternatively, liners may be used to provide the appropriate clearance and fit.

The transducer 10, preferably, is manufactured by drilling a hole through the center of the piezoelectric element 12 using a diamond drill. The transducer is then assembled and the center aperture is bored through the transducer assembly, and finally the tubing 25 is inserted and mounted in place. The transducer, typically, is designed for operation at 2.25 mHz. It will be apparent that this frequency may be varied to suit the desired conditions.

Figure 3B:
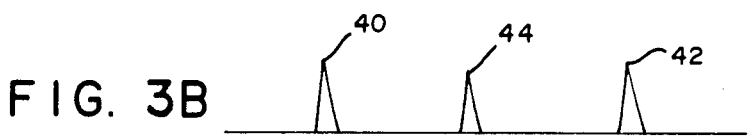
Figure 3C:
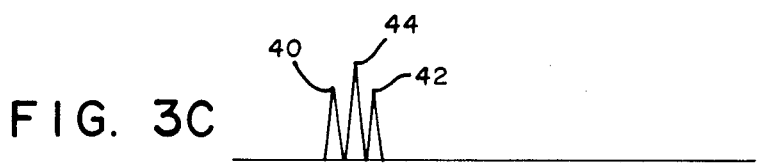

As shown in FIG. 2, the transducer 10 is placed at the appropriate location of the body 34 which is subjected to the surgical procedure. A thin amount of a sterile couplant material 36 is interposed between the transducer 10 and the body 34. The transducer is connected to a standard pulse-echo instrument having a cathode ray tube screen as is well understood in the art. Assuming that the surgical instrument is an aspiration device and that the needle 30 is to be inserted into a cyst for the purpose of draining fluid from the cyst, the progress of this procedure is clearly visible by reference to FIG. 3A which indicates the signals on a cathode ray tube using the conventional A-scan. As the transducer 10 is energized with electric energy and propagates ultrasonic pulses toward the interior of the body 34, it receives echo signals and the signal 40 represents the echo signal from the outer wall or boundary of the cyst while the echo signal 42 is the echo signal originating from the inner wall of the cyst. In FIG. 3B the needle 30 has been inserted into the cyst and the tip of the needle is located substantially in the center of the cyst boundaries as is indicated by the position of the echo 44. Responsive to aspiration, FIG. 3C, the cyst collapses as is clearly evident from the narrowed space between the signals 40 and 42. Actually, as the needle is inserted into the body, the advance of the needle can be followed most precisely.

Figure 4A:
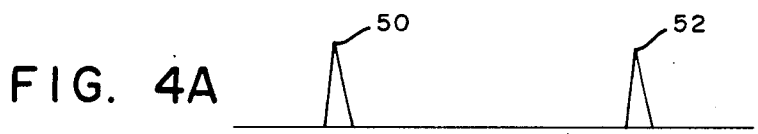
FIGS. 4A and 4B are schematic illustrations of the display obtained on a cathode ray tube when using a biopsy needle.
Figure 4B:
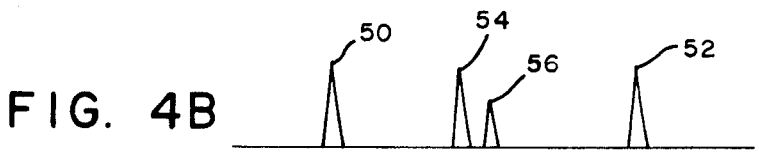

FIG. 4A shows the use of a biopsy needle which includes an assembly of an inner and an outer needle. The echoes 50 and 52 indicate the front and rear boundaries of a tumor. In FIG. 4B the needle of the instrument has been centered within the tumor, the echo 54 representing the position of the main needle and the signal 56 indicating the position of the inner needle. The section between the signals 54 and 56 is normally cut for biopsy.

It will be apparent that the instant transducer is extremely valuable in placing surgical instruments accurately within a living organism and monitoring the progress of the particular surgical procedure. The exact acoustic phenomena which occur making this ultrasonic transducer used in connection with a surgical instrument so valuable is not clearly understood at this moment. It is believed that the piezoelectric element generates acoustic energy in the radial shear mode in addition to energy in the longitudinal mode and that the energy produced, at least in part, propagates along the surgical needle both toward the internal part of the body and is reflected therefrom and conducted back to the transducer. The needle may quite well act as a transmission wave guide. The high degree of resolution obtained and indicated in FIGS. 3 and 4 has been a rather unexpected result. Moreover, before using the surgical instrument, the transducer is used to accurately locate the internal organ and angulate the direction along which the surgical instrument must be inserted into the body. After these determinations have been made, the surgical instrument is inserted in the aperture of the transducer and thrust into the body toward the particular location.

If desired, the housing 22 may include or be fitted with an extending handle or finger grip.

With regard to the use of ultrasonic pulse-echo transducers and display equipment for medical purposes reference is made to "Ultrasonic Engineering" (book) by Julian R. Frederick, John Wiley & Sons, Inc., New York, N.Y. (1965), Chapter 9, pages 317 through 344.

It will be apparent that the transducer disclosed heretofore when used in conjunction with a surgical instrument of the type indicated above greatly enhances the safety and accuracy with which a variety of surgical procedures are carried out and, therefore, constitutes a major advance in the art.

What is claimed is:

1. A transducer for pulse-echo ultrasonic exploration of a biological body comprising in combination a housing, a piezoelectric wafer disposed in said housing and adapted to be acoustically coupled to said body, electrical connections coupled to said wafer for applying electrical pulse signals to said wafer and providing electrical signals responsive to acoustic echo signals received by said wafer, a backing layer contacting one side of said wafer for damping acoustic energy received by said wafer, wherein the improvement comprises:

an aperture disposed substantially centrally through the thickness of said wafer and extending through said backing layer and housing for receiving therein a surgical instrument whose frontal end is adapted to be inserted into a body, whereby responsive to electrical excitation of said wafer with electrical pulse signals echo signals are obtained from the boundaries within said body and the position of said frontal end in relation to said boundaries.

2. A transducer for pulse-echo ultrasonic exploration as set forth in claim 1, said aperture being of circular cross-section.

3. A transducer for pulse-echo ultrasonic exploration as set forth in claim 1, said aperture being of rectangular cross-section.

4. A transducer for pulse-echo ultrasonic exploration as set forth in claim 1, said aperture being dimensioned to cause said transducer to slidingly fit over a needle or probe-like surgical instrument.

5. A transducer for pulse-echo ultrasonic exploration as set forth in claim 1, said aperture of said transducer being lined with a tubing of polymeric plastic material.

6. A transducer for pulse-echo ultrasonic exploration as set forth in claim 5, said tubing being secured to said transducer.

7. A transducer for pulse-echo ultrasonic exploration as set forth in claim 1, and a protective plate disposed in front of said wafer for contacting the body to be explored.

8. A transducer for pulse-echo ultrasonic exploration comprising:

a housing having an aperture;

an annular piezoelectric element disposed in said housing for propagating, when energized, ultrasonic energy to a body and receive ultrasonic echo signals arising from boundaries within such body;

electrical connections coupled to said element for providing electrical energy to said element and for receiving electrical signals therefrom, and the aperture of said housing and the central aperture of said annular element being aligned for receiving therein the frontal portion of an instrument adapted to be thrust into such body.

9. A transducer for pulse-echo ultrasonic exploration as set forth in claim 8, the aperture of said housing and the aperture of said element being dimensioned to provide a sliding fit with said frontal portion for enabling said frontal portion to be slidably moved through said transducer.

References Cited

UNITED STATES PATENTS

| | | | |
|---|---|---|---|
| 2,714,890 | 8/1955 | Vang | 128—24 A |
| 3,556,079 | 1/1971 | Omizo | 122—2 V |
| 3,618,594 | 11/1971 | Banko | 128—24 A |
| 3,620,209 | 11/1971 | Kravitz | 128—303 R |

LAWRENCE W. TRAPP, Primary Examiner

U.S. Cl. X.R.

128—24 A